Patented Nov. 10, 1942

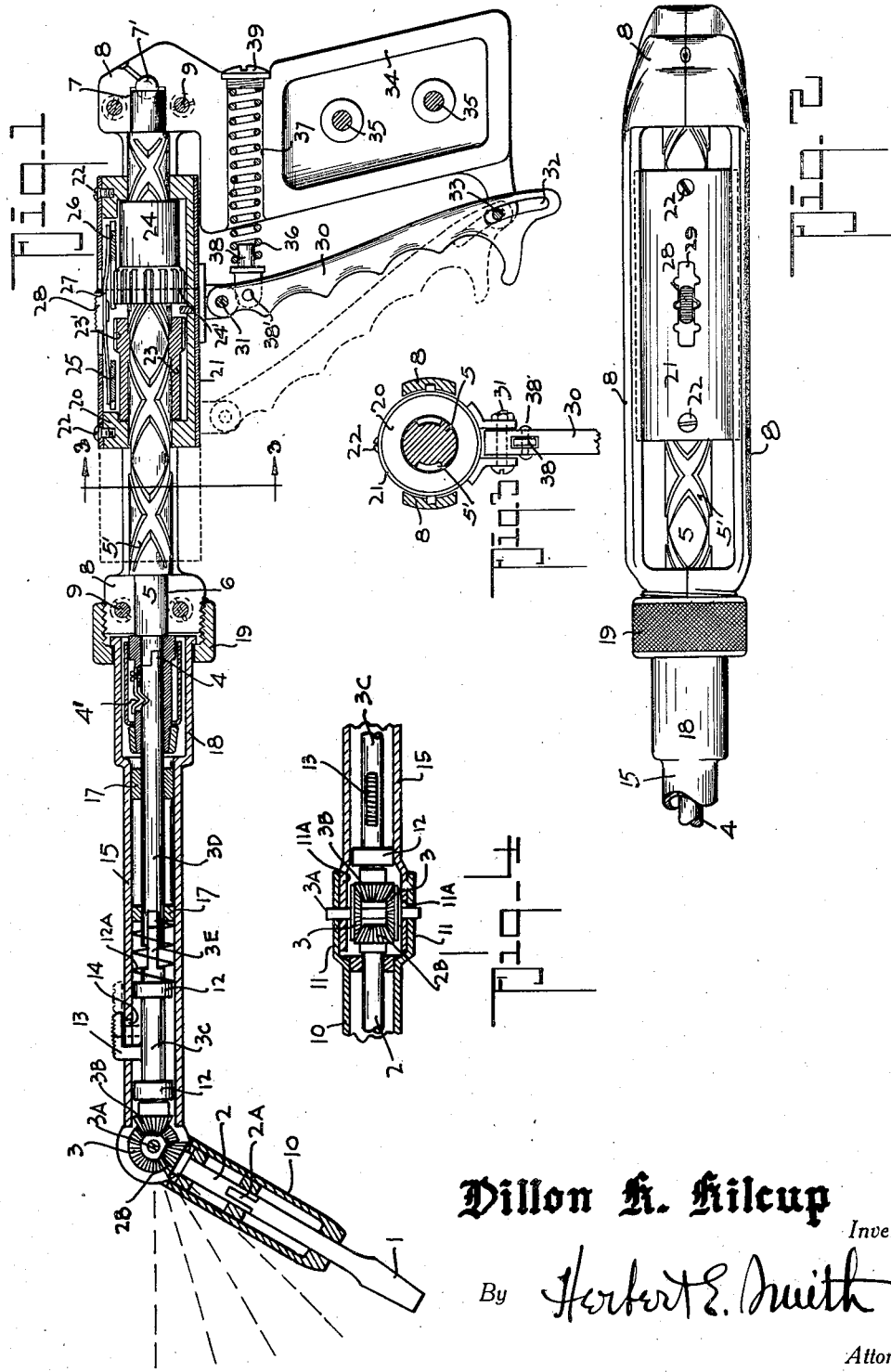

2,301,413

UNITED STATES PATENT OFFICE 2,301,413

DRIVE MECHANISM

Dillon K. Kilcup, Spokane, Wash.

Application August 15, 1939, Serial No. 290,173

2 Claims. (Cl. 74—57)

My present invention relates to improvements in drive mechanisms of the type involving the use of a spirally grooved shaft and ratchet devices cooperating therewith to translate reciprocating motion of the actuating device to rotary motion of the screw driver. While I shall hereinafter, for convenience of description and illustration, refer to the invention as applied to a screw driver, it will be understood that the principles of my invention may be embodied in other hand tools of this type wherein the power of the reciprocating mechanism is translated into rotary movement of the tool.

In carrying out my invention in the form of a screw driver I employ a flexible tool that is angularly adjustable in order that the tool-bit or blade of the screw driver may be applied to screws located in otherwise inaccessible places, and the flexible tool is adequately supported in its angularly adjusted position to permit application of the required hand pressure to retain the screw-blade in the kerf of the screw, and at the same time the required power is available for turning the screw.

The action of the power mechanism is reversible in order that a screw may be turned home, or when required the screw may be removed. By the combination and arrangement of parts of the tool I am enabled to provide a one-hand tool which is compact, and efficient in operation, as well as simple in construction.

The invention consists in certain novel combinations and arrangements of parts as will hereinafter be more fully set forth and claimed.

In the accompanying drawing I have illustrated one complete example of the physical embodiment of my invention wherein the parts are combined and arranged according to the best mode I have thus far devised for the practical application of the principles of my invention.

Figure 1 is a longitudinal sectional view of the tool, with some parts in full lines, showing the blade or bit disposed at an angle to the longitudinal axis of the tool, and indicating by dotted lines the lever action and the range of movement of the reciprocating barrel, slide or head.

Figure 2 is a top plan view, or edge view, of the tool, with parts broken away for convenience of illustration.

Figure 3 is a transverse sectional view at line 3—3 of Figure 1.

In carrying out my invention, I utilize a comparatively short screw driver bit or blade 1 that is applied in the usual manner to the kerf of a screw, and this blade is coupled to the shank 2 by means of the detachable coupling 2A. The shank 2 has a pinion gear 2B on its upper end, and this pinion is meshed with a pair of bevel gears 3 loosely mounted upon the cross pivot shaft 3A. A second pinion gear 3B also meshes with the bevel gears 3, and the spring-pressed shank 3C is associated therewith. The shank 3C is coupled to the shank 3D through the medium of the extensible spline coupling 3E. The shank 3D is detachably connected by a socket coupling 4 and its fastening device 4' to the rotary shaft 5. Shaft 5 is provided with two sets of spiral grooves 5' of well known type through which the shaft may be rotated in opposite directions. The bit or blade 1, the shanks 2 and 3C coupled through the pinion gears 2B and 3B and the bevel gears 3—3, and the drive shaft 4, thus form a flexible drive shaft for the tool. The shaft 5 is provided with a front journal bearing 6, a rear journal bearing 7, and a rear ball-thrust bearing 7' located in a sectional housing or frame 8, which is split, and fastened together by means of screws or rivets 9.

The bit or screw blade 1 and the shank 2 are supported to rotate in a tubular bit stock 10 having yoke plates 11 on the upper end which form part of an angularly adjustable housing for the rotary tool or screw driver. A similar pair of yoke plates 11A are mounted on the forward end of the tube 15, and the free ends of the two yokes are pivotally joined by the shaft or trunnion 3A. As indicated in Figure 1, the shank 3D is journaled in alined bearings 17 and 17A that are spaced apart within the tube or tubular part of the housing 15.

In order to permit angular adjustment of the bit 1 with relation to the drive shaft 4, I provide the shank 3C with bearings or collars 12—12 slidable in the tube 15, and the spring 12A acts between the fixed bearing 17 and the rear collar 12 to normally keep the shank 3C extended outwardly so that the gear pinion 3B is meshed with the bevel gears 3—3. An upstanding arm 13 is connected to the shank 3C and extends through the slot 14, where it may be engaged by the operator to withdraw the pinion 3B from mesh with the bevel gears.

The rear end of the housing 15 is enlarged to form an attaching head 18 that encloses the detachable joint between the shank and the drive shaft. The flexible portion of the shaft and its housing are coupled to the drive-section of the shaft and frame 8, respectively, by means of a coupling nut 19, which is threaded to engage complementary threads on the frame 8 and flanged to engage a complementary flange on the attaching head 18, thus making a quick-detachable coupling with the operating and actuating portions of the hand tool.

Upon the spirally grooved shaft is mounted a cylindrical, non-rotary, reciprocating sleeve 20, encased in a cylindrical jacket or casing 21, which is secured to the sleeve by means of screws 22. Within the sleeve, and mounted on the spirally grooved shaft are two spaced ratchet bushings 23 and 24, each having an exterior ratchet ring as 23' and 24', and these two bushings reciprocate with the sleeve, the latter being guided in its reciprocation by the frame 8, which also prevents turning of the sleeve.

One of the bushings is rigidly coupled with the non-rotary but reciprocating sleeve to turn the screw driver in one direction, and the other bushing is rigidly coupled with the sleeve to turn the screw driver, through engagement with the grooved shaft, in the opposite directions. For this selective movement two pawls 25 and 26 for co-action with the ratchet bushings are mounted on opposite ends of a spring blade 27 extending longitudinally within the sleeve, and the central portion of this spring blade is provided with a block or button 28 that projects outwardly through a slot 29 formed in the sleeve and its jacket. Pressure of the thumb on the button, to the right or left in Figures 1 and 2, will result in engaging one or the other of the bushings with the sleeve so that the reciprocal movement of the sleeve will be translated into rotary movement of the grooved shaft and the screw driver.

For actuating the operating sleeve, I employ a lever 30 which at one end is pivoted at 31 to the sleeve, and the other end of this lever is provided with a "floating" pivotal connection including a slot 32 in the lever, a retaining pin 33 in the slot, and the handle or stock 34 of the main frame. This stock or handle is also split, i. e., its parts are integral with the sectional frame, and rivets or screws 35 are used to fasten the halves of the handle together.

The handle or stock is in the shape of a pistol-grip to accommodate the hand, and the lever is fashioned with recesses to accommodate the fingers of the hand that grasps the stock, thus requiring the use of only one hand, while the other hand of the operator is free for use in applying the screw.

The power stroke of the screw driver is accomplished by pressure of the hand and fingers, and the return movement of the reciprocating sleeve is accomplished by means of a spring 36 that is located in a recess 37 extending transversely through the handle or stock. The forward end of the spring is anchored against a clevis 38 that is pivoted at 38' to the lever, and the rear end of the spring is anchored against a screw plug 39 that is threaded in the rear end of the spring recess of the stock.

In Figure 1 the sleeve has been pulled back on its working stroke by the hand and fingers grasping the stock and lever, and the lever has swung on its floating fulcrum or pivot-joint 32—33. When the finger-grip is released from the lever, the spring, which has been compressed on the power stroke of the lever, exerts its tension on the lever and expands, to swing the lever forward as indicated in dotted lines and thus slide the sleeve to position for a succeeding working stroke. The hand tool is thus operated or actuated by alternately applying pressure, by hand and finger grasp to the lever, and releasing the finger pressure on the lever. A constant and continuous pressure is applied to the tool as a whole by the hand on the stock, and the blade of the screw driver is thus maintained in its operative position in the kerf of the screw regardless of whether the blade is being turned.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus fully described my invention, what I claim as new and desire to secure by Letters Patent is:

1. In a drive mechanism for rotary driven elements, the combination of a rotary drive shaft, a non-rotary reciprocable sleeve mounted on the shaft, coacting means in the sleeve and associated with the shaft for translating the movement of the sleeve in one direction into rotary movement of the shaft, means for disassociating said sleeve from the shaft when the sleeve moves in the opposite direction, a handle-frame adapted to receive and support said sleeve for sliding movement, a grip projecting laterally from said handle-frame, a spring pressed lever having a pivotal connection with the reciprocable sleeve and a floating fulcrum on the grip.

2. In a mechanism for rotary driven elements, the combination of a rotary drive shaft, a non-rotary reciprocable sleeve mounted on the shaft and including means for translating the movement of the sleeve in one direction into rotary motion of the shaft, means for disassociating the sleeve from the shaft when the sleeve is moved in the opposite direction, a handle-frame adapted to receive and support the sleeve for its reciprocable movement, a grip projecting laterally from said frame, an actuating lever pivotally connected at one end to the sleeve to move the same and having a slot and pin connection to the grip at the other end forming a floating fulcrum, and a spring interposed between the lever and said grip.

DILLON K. KILCUP.